July 6, 1926.
H. L. CARR
HANDLE FASTENING FOR HOES
Filed March 20, 1924
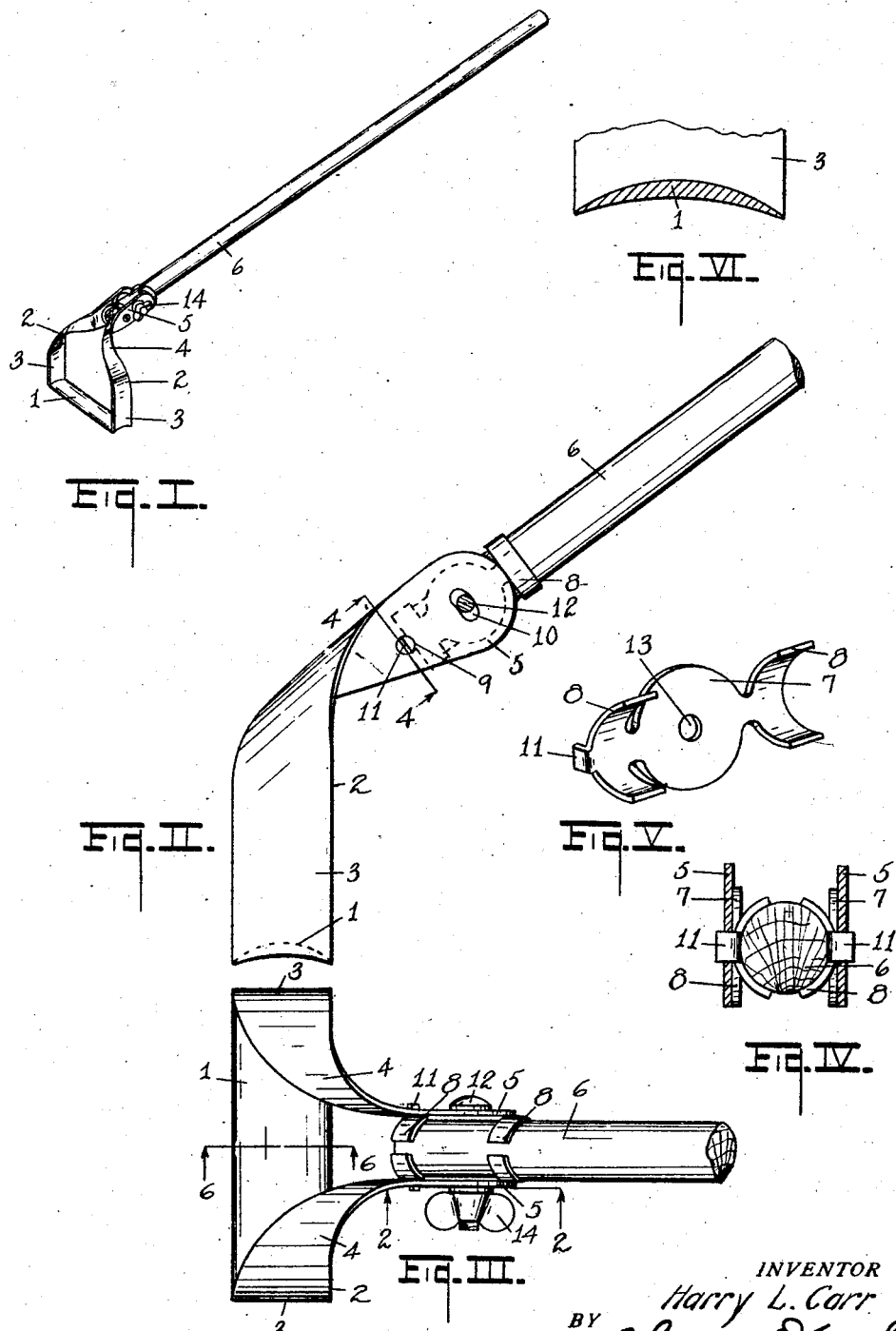
INVENTOR
Harry L. Carr.
BY
Chappell Earl
ATTORNEYS Patented July 6, 1926.

1,591,280

UNITED STATES PATENT OFFICE.

HARRY L. CARR, OF HASTINGS, MICHIGAN.

HANDLE FASTENING FOR HOES.

Application filed March 20, 1924. Serial No. 700,597.

This invention relates to improvements in hoes.

The main objects of this invention are:

First, to provide an improved hoe of the "scuffle" type which is very easily operated, enabling the performance of a relatively large amount of work for a slight effort expended.

Second, to provide an improved "scuffle" hoe in which the handle may be readily adjusted to the convenience of the particular user.

Third, to provide an improved "scuffle" hoe, the blade of which is so shaped or designed that it remains in the ground with little effort, both on the forward and rearward strokes of the hoe and also which tends to maintain sharp edges.

Fourth, to provide an improved means for adjustably connecting the blade of a hoe to the handle.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this application, in which:

Fig. I is a perspective view of a hoe embodying the features of my invention.

Fig. II is an enlarged side elevation partially in section on a line corresponding to line 2—2 of Fig. III, the handle being partially broken away.

Fig. III is a plan view with the handle partially broken away.

Fig. IV is a transverse section on a line corresponding to line 4—4 of Fig. II showing details of the handle attaching means.

Fig. V is a perspective view of one of the handle coupling members.

Fig. VI is a detail section on a line corresponding to line 6—6 of Fig. III showing the details of the blade.

In the drawing similar reference characters refer to similar parts throughout the several views, and the sectional views are taken looking in the direction of the little arrows at the ends of the section lines.

Referring to the drawings, the blade 1 of my improved hoe is of substantial width but relatively long and is of concavo-convex cross section as shown in Fig. VI, the blade being horizontal. The blade is provided with a shank designated generally by the numeral 2 and comprises parallel upright portions 3 and rearwardly and inwardly curved portions 4 having quarter twists therein and terminating in ends 5 disposed in parallel vertical planes and in spaced relation to receive the handle 6 between them. These shanks are formed integrally with the blade, the inwardly curved and twisted portions 4 thereof being uniform so that the blade is balanced and the twists are gradual so that the shanks are not weakened by abrupt bends, in fact, the twisting of the same results in strengthening the same.

The shanks are adjustably secured to the handle by means of the coupling members 7 formed of sheet metal and having U-shaped arms 8 at each end, the portion between the arms being disc-like to form clamping members against which the shanks are clamped.

The shanks are provided with pivot holes 9 and with transverse slots 10.

The coupling members are arranged with their arms embracing the handle in opposed relation. The coupling members are provided with pivot lugs 11 engaging the pivot holes 9.

The clamping bolt 12 is arranged through the handle, the holes 13 in the coupling members and through the shanks, clamping these parts together, thereby adjustably securing the blade to the handle. A thumb nut 14 is provided for the bolt for convenience in adjusting.

By means of this connection the blade is adjusted upon the handle to suit the convenience of the particular user. By forming the blade of concavo-convex cross section as illustrated, it tends to hold itself in the ground, both on the forward and back stroke and also, the wear on the edges of the blade tends to keep the same sharp.

The blade and shanks may be formed of a relatively light material and yet may be strong and durable. The providing of shanks at the end of the blade serve as guides for the operator in manipulating the tool alongside the plants.

Having thus described my invention, what I claim as new and desire to secure by Letters Patent, is:

1. The combination with a pair of tool shanks provided with pivot openings and with opposed slots, a handle disposed between said shanks, a pair of opposed coupling members having U-shaped spaced arms embracing the handle and disc-like intermediate clamping portions, said coupling members being provided with pivot lugs engaging said pivot openings in said shanks, and a clamping bolt arranged through said handle and coupling members to engage said slots in said shanks whereby the shanks are adjustably secured to the handle.

2. The combination with a pair of tool shanks provided with pivot openings and with opposed slots, a pair of opposed coupling members disposed on said handle and having U-shaped arms at their ends embracing the handle and having outwardly turned lugs engaging the pivot holes in said shanks, said coupling members having clamping disc portions, and a clamping bolt arranged through said handle and coupling members to engage said slots in said shanks.

3. The combination with a pair of tool shanks spaced to receive a handle between them and being provided with pivot openings and with opposed slots, coupling members disposed on said handle and provided with pivots engaging said pivot holes in said shanks, and a clamping bolt arranged through said handle and coupling members to engage said slots in said shanks.

In witness whereof, I have hereunto set my hand.

HARRY L. CARR.